T. A. EDISON.
DEVICE FOR VIEWING MOVING PICTURES.
APPLICATION FILED NOV. 19, 1908.
964,097.
Patented July 12, 1910.
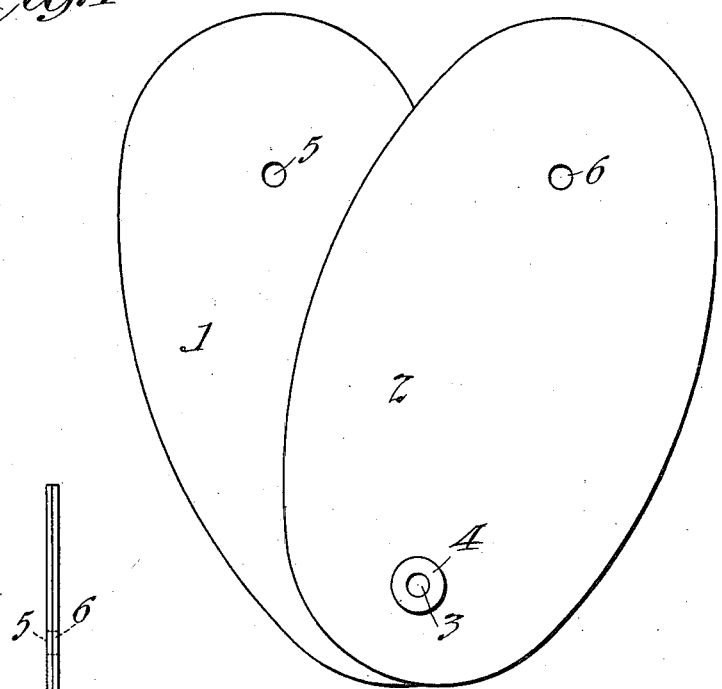
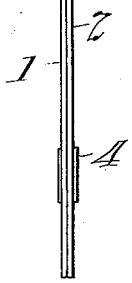
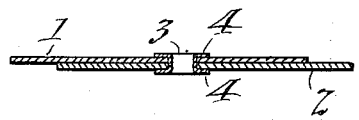

UNITED STATES PATENT OFFICE.

THOMAS A. EDISON, OF LLEWELLYN PARK, WEST ORANGE, NEW JERSEY.

DEVICE FOR VIEWING MOVING PICTURES.

964,097.      Specification of Letters Patent.      Patented July 12, 1910.

Application filed November 19, 1908. Serial No. 463,341.

*To all whom it may concern:*

Be it known that I, THOMAS A. EDISON, a citizen of the United States, and a resident of Llewellyn Park, West Orange, county of Essex, and State of New Jersey, have invented certain new and useful Improvements in Devices for Viewing Moving Pictures, of which the following is a full, clear, and concise description.

My invention relates to devices by means of which moving pictures may be viewed with as little as possible of the objectionable flicker or scintillation, which is a well known defect of moving or animated pictures in the present state of the art.

More specifically, my invention provides leaves or members provided with small eye holes of about the size of the pupil of the eye, which may be held in front of the eye and through which the moving pictures are viewed. I have found that the provision of such means as this reduces considerably the objectionable flicker defect when the device is held a short distance in front of the eyes. This beneficial effect may result in some measure from the cutting down of the supply of light entering the eye when the shutter is open, thus reducing the painful shock caused the eye by the impact of light thereon when the shutter is fully opened. Whatever the cause, experiment has demonstrated that the beneficial result exists.

My invention furthermore provides means for adjusting the distance between the eye holes to adapt the same for use by various people, and also to allow the device when closed to occupy less room and thereby fit into a coat pocket or the like.

One form in which my invention may be embodied is shown in the accompanying drawings in which—

Figure 1 represents a face view of my invention, the leaves thereof being shown in adjusted position. Fig. 2 represents a side view of the device and Fig. 3 represents a transverse section through Fig. 1.

In the embodiment of my device two leaves or members 1 and 2 are provided, preferably of card board, or they may be made of other thin cheap material. These leaves or members are pivoted together as by an eyelet 3, which may be formed of brass, tin or other metal, and which is bent over the leaves 1 and 2 forming flanges 4, which embrace the edges of the opening and hold the members 1 and 2 in any adjusted position by a certain amount of friction. Eye holes 5 and 6 are provided in the leaves 1 and 2 at the same radial distance from pivot 3, these eye holes being preferably about the size of the pupil of the eye. The body of the leaves may bear advertising matter or the like.

In the operation of the device, the user adjusts the latter in front of the eyes until a clear view is obtained of the moving pictures through eye holes 5 and 6.

While the form of my device which I have here illustrated is excellently well adapted for the purpose desired, it is, of course, obvious that other means might be provided for adjusting the distance between eye holes 5 and 6, without departing from the spirit of my invention.

Having described my invention, what I claim is new therein and desire to secure by Letters Patent is as follows:

1. In an anti-flicker device for viewing moving pictures, two members of inconsiderable width, each provided with a small eye hole therethrough, said members being pivoted together at a point in each equally distant from said eye holes, so that said members may be adjusted to locate the holes in front of the eyes of the spectator, substantially as described.

2. In an anti-flicker device for viewing moving pictures, two flat elongated leaves of inconsiderable width, means passing through said members toward one end of each on which said members are pivoted to slide across each other, and frictionally engaging the same to maintain them in adjusted position, each of said leaves being provided with a small eye-hole therethrough toward the end distant from said pivot, at the same distance from said pivot, substantially as described.

This specification signed and witnessed this 16th day of November, 1908.

THOS. A. EDISON.

Witnesses:
    DYER SMITH,
    ANNA R. KLEHM.